(12) United States Patent
Jensen et al.

(10) Patent No.: US 6,520,589 B2
(45) Date of Patent: Feb. 18, 2003

(54) SIDE DUMP BODY

(75) Inventors: Layton W. Jensen, Thurston, NE (US); Ralph R. Rogers, Dakota Dunes, SD (US)

(73) Assignee: Thurston Manufacturing Company, Thurston, NE (US)

(*) Notice: Subject to any disclaimer, the term of this patent is extended or adjusted under 35 U.S.C. 154(b) by 0 days.

(21) Appl. No.: 09/826,582

(22) Filed: Apr. 5, 2001

(65) Prior Publication Data

US 2002/0145328 A1 Oct. 10, 2002

(51) Int. Cl.$^7$ .................................................. B60P 1/16
(52) U.S. Cl. .................... 298/17.7; 298/17.5; 298/17.6; 298/18
(58) Field of Search ................ 298/13, 17.5, 17.6, 298/17.7, 18; 296/184

(56) References Cited

U.S. PATENT DOCUMENTS

| | | | | |
|---|---|---|---|---|
| 5,480,214 A | * | 1/1996 | Rogers | 298/17.6 |
| 5,597,211 A | * | 1/1997 | Golden | 298/17.6 |
| 5,845,971 A | | 12/1998 | Rogers | 298/18 |
| 5,906,417 A | * | 5/1999 | Golden | 298/17.6 |
| 6,056,368 A | | 5/2000 | Rogers | 298/18 |
| 6,106,072 A | * | 8/2000 | Lutter, Jr. | 298/17.7 |
| 6,257,670 B1 | * | 7/2001 | Rogers | 298/18 |

* cited by examiner

Primary Examiner—Stephen T. Gordon
(74) Attorney, Agent, or Firm—Thomte, Mazour & Niebergall; Dennis L. Thomte

(57) ABSTRACT

A side dump body truck or trailer comprising a body pivotally mounted on a wheeled frame and fashioned so as to enable the material within the trailer body to be dumped from either side of the trailer. The body is constructed of rear, intermediate and front bulkheads having bottom wall and side wall portions in abutting relationship therewith and being welded thereto. The front and rear bulkheads are preferably angled upwardly and outwardly so as to increase the carrying capacity of the body. The bottom of the body is preferably V-shaped to increase the carrying capacity of the body.

12 Claims, 5 Drawing Sheets

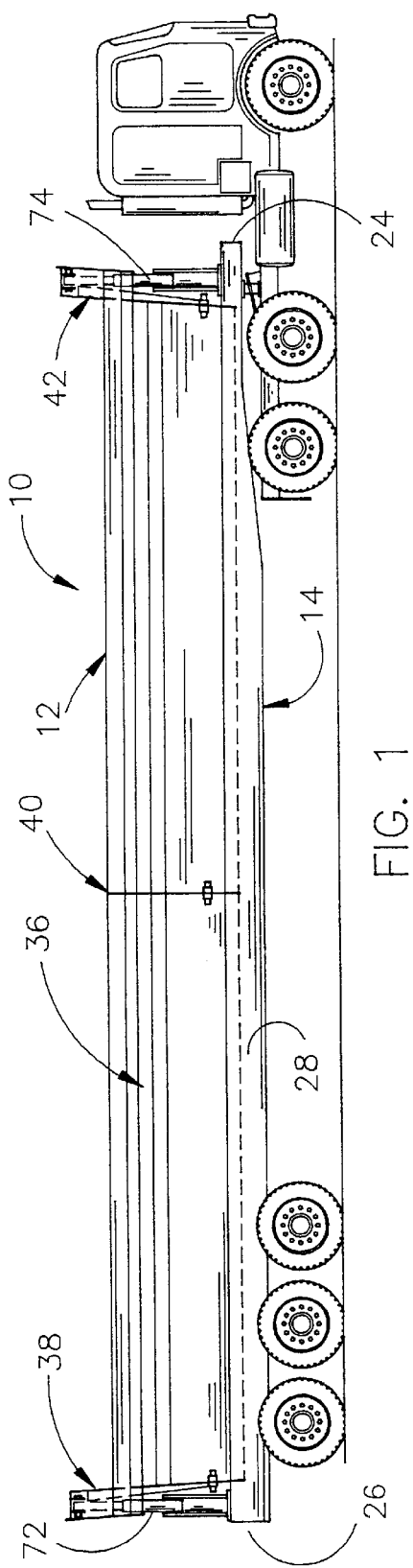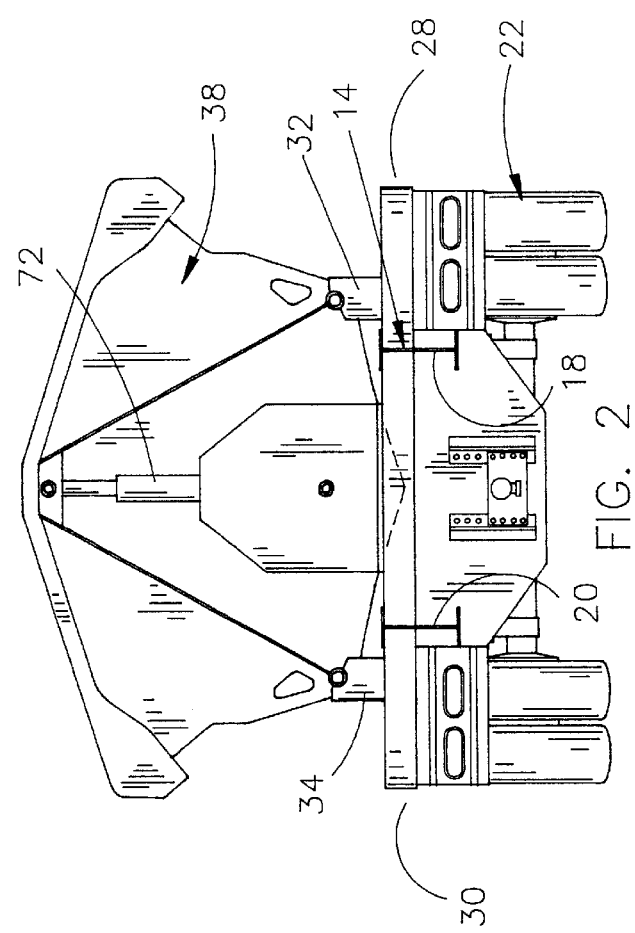

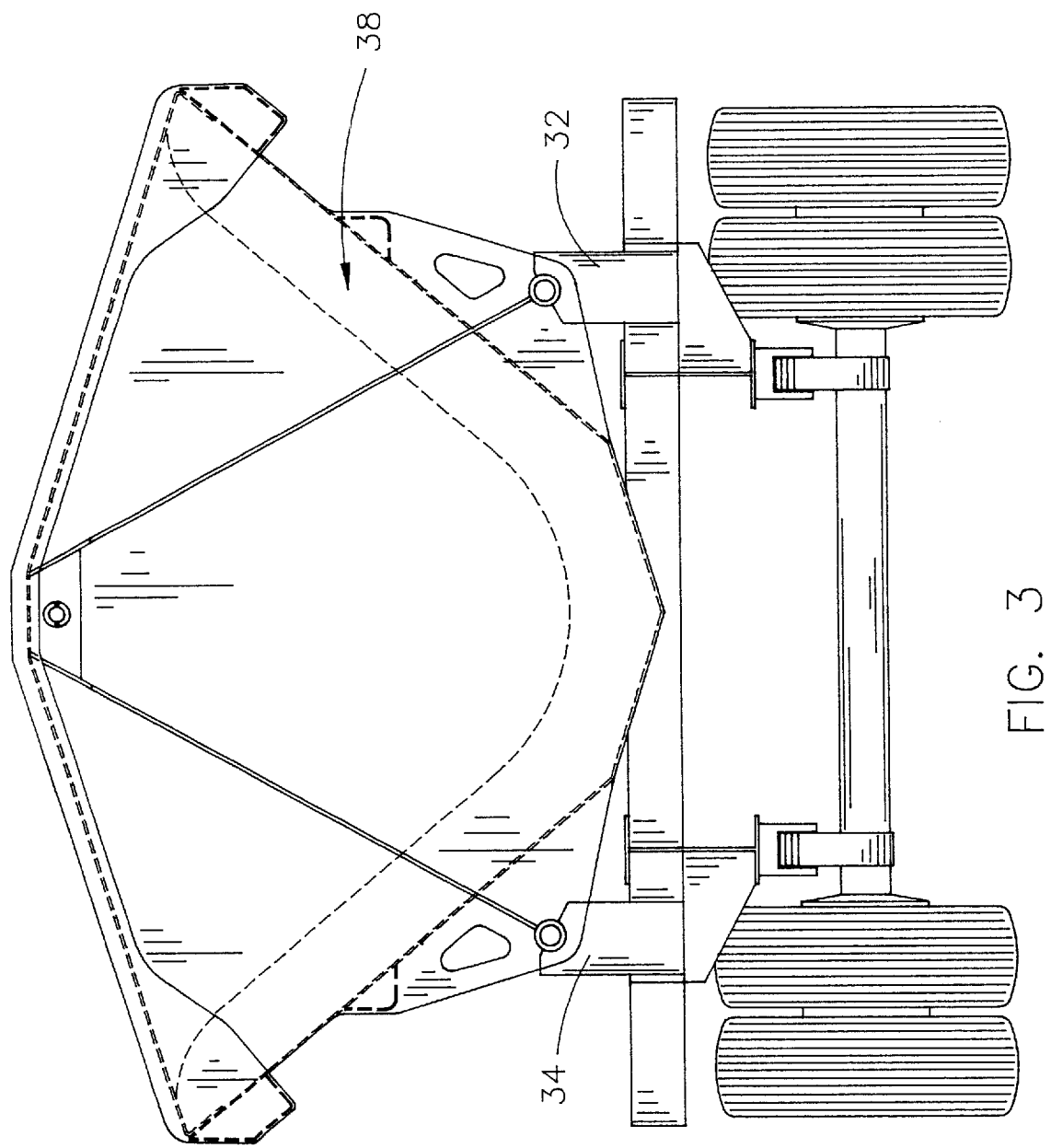

SIDE DUMP BODY

BACKGROUND OF THE INVENTION

1. Field of the Invention

This invention relates to a side dump body and more particularly to a side dump body for use on a trailer or truck wherein the body comprises upstanding rear, intermediate and front bulkheads having bottom wall portions and side wall portions positioned therebetween and welded thereto. Further, this invention relates to a side dump body which has an increased carrying capacity when compared to conventional side dump trailers.

2. Description of the Related Art

Dump bodies which are employed on trailers or trucks normally are of the end dump type or the side dump type. Since the introduction of the side dump body disclosed in U.S. Pat. No. 5,480,214, side dump trucks and trailers have experienced wide acceptance. The side dump trailers such as disclosed in U.S. Pat. No. 5,480,214 normally comprise front and rear bulkheads with a single sheet of metal material extending between the bulkheads with the single sheet of material normally being bent or broken to form the bottom wall and at least a portion of the side walls.

Normally, the vertical height of the side walls is achieved by side wall extensions formed from a single sheet of material at each side of the body. When the trailers have a length of over 20 feet, which is common, it is extremely difficult to bend a long sheet member to form the bottom and sides of the body. Very few manufacturing facilities have the capability of bending sheet material having lengths over 20 feet.

SUMMARY OF THE INVENTION

A side dump body is disclosed which includes an elongated wheeled frame having a plurality of first supports positioned thereon adjacent one side thereof and a plurality of second supports positioned thereon adjacent the other side thereof. An elongated body is pivotally movably mounted on the wheeled frame and is movable between non-dumping and dumping positions. The body is comprised of rear, intermediate and front bulkheads. A rear bottom wall portion is welded to the front surface of the rear bulkhead and is welded to the rear surface of the intermediate bulkhead. A front bottom wall member is welded at its rearward end to the front surface of the intermediate bulkhead and is welded at its forward end to the rear surface of the front bulkhead. First and second side wall members are welded at their rearward ends to the front surface of the rear bulkhead so as to extend upwardly and outwardly from the rear bottom wall portion. Third and fourth side wall portions have their rearward ends welded to the front surface of the intermediate bulkhead and have their forward ends welded to the rear surface of the front bulkhead. Each of the bulkheads has a first pivot plate secured thereto which extends laterally therefrom at one side thereof and has a second pivot plate secured thereto which extends laterally therefrom at the other side of the bulkhead. Pivot support plates are selectively removably pivotally secured to the first and second supports on the wheeled frame, respectively.

The utilization of metal sheet members which extends between a rear bulkhead and an intermediate bulkhead and the utilization of sheet members which extend between the intermediate bulkhead and the front bulkhead enables a 34-foot trailer, for example, to be constructed utilizing 17-foot sheet members which are easier to bend or form than are 34-foot sheet members. The same is also true for a 20-foot trailer which could be fabricated utilizing 10-foot sheet members rather than 20-foot sheet members. The bottom wall of the body is V-shaped in section which increases the carrying capacity of the body. Hydraulic cylinders are provided for pivotally moving the body between its non-dumping and dumping positions.

It is therefore a principal object of the invention to provide an improved side dump body for use on a truck or trailer.

Still another object of the invention is to provide a side dump body utilizing rear, intermediate and front bulkheads so that shorter metal sheet members may be utilized in the construction of the body.

Still another object of the invention is to provide a side dump body of the type described which has increased carrying capacity.

Still another object of the invention is to provide a side dump body wherein the rear, intermediate and front bulkheads have pivot support plates extending therefrom which represents a reduction in weight as compared to conventional side dump bodies wherein the pivot support plates are welded to the exterior surfaces of the side walls of the body.

Another object of the invention is to provide a side dump body which is easier to manufacture than conventional side dump bodies.

These and other objects will be apparent to those skilled in the art.

BRIEF DESCRIPTION OF THE DRAWINGS

FIG. 1 is a side view of the side dump body of this invention;

FIG. 2 is a rear view of the side dump trailer of this invention;

FIG. 3 is a front view of the side dump trailer of this invention;

DESCRIPTION OF THE PREFERRED EMBODIMENT

Figure 4:
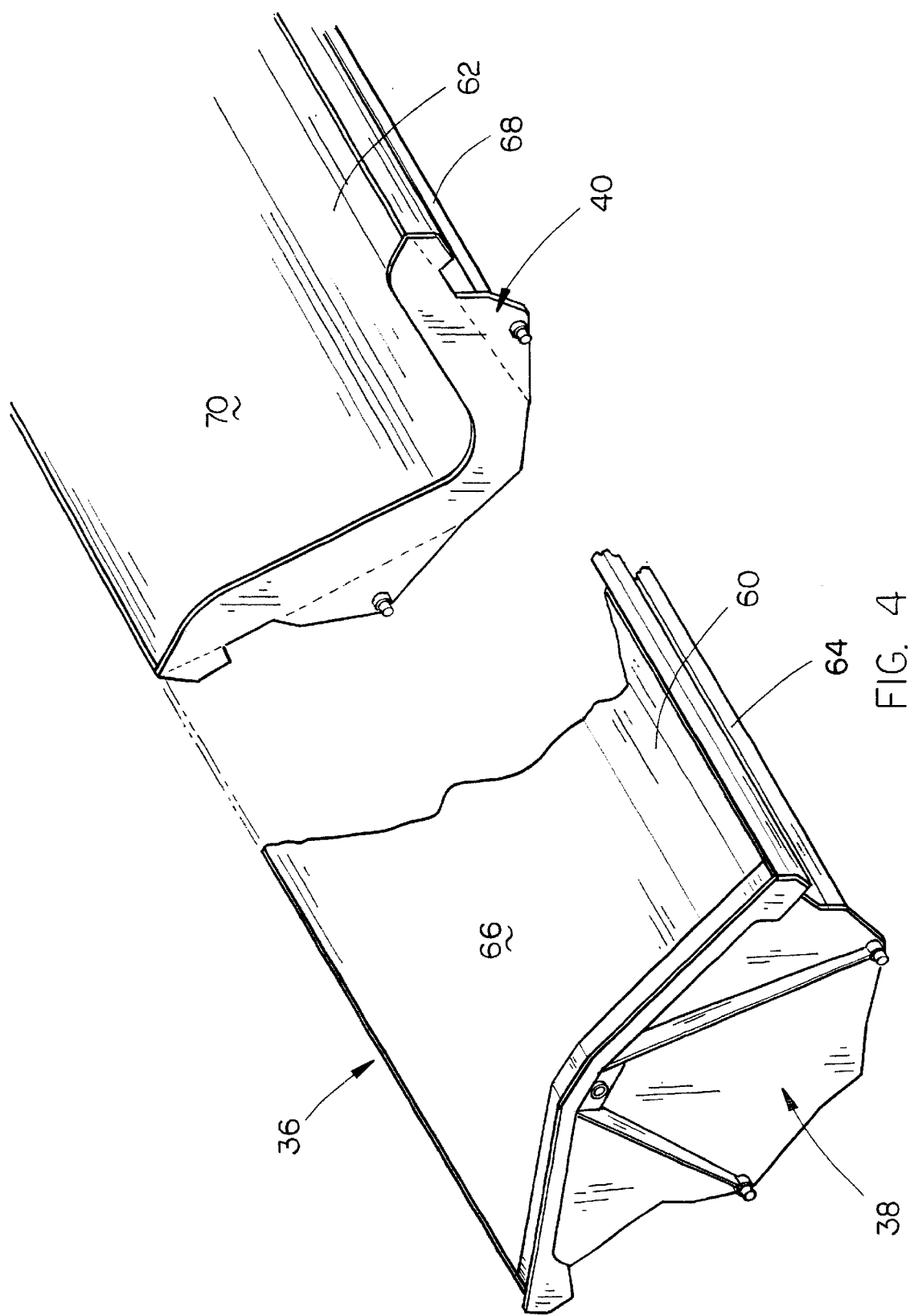
FIG. 4 is a partial perspective view of the side dump body of this invention.
Figure 5:
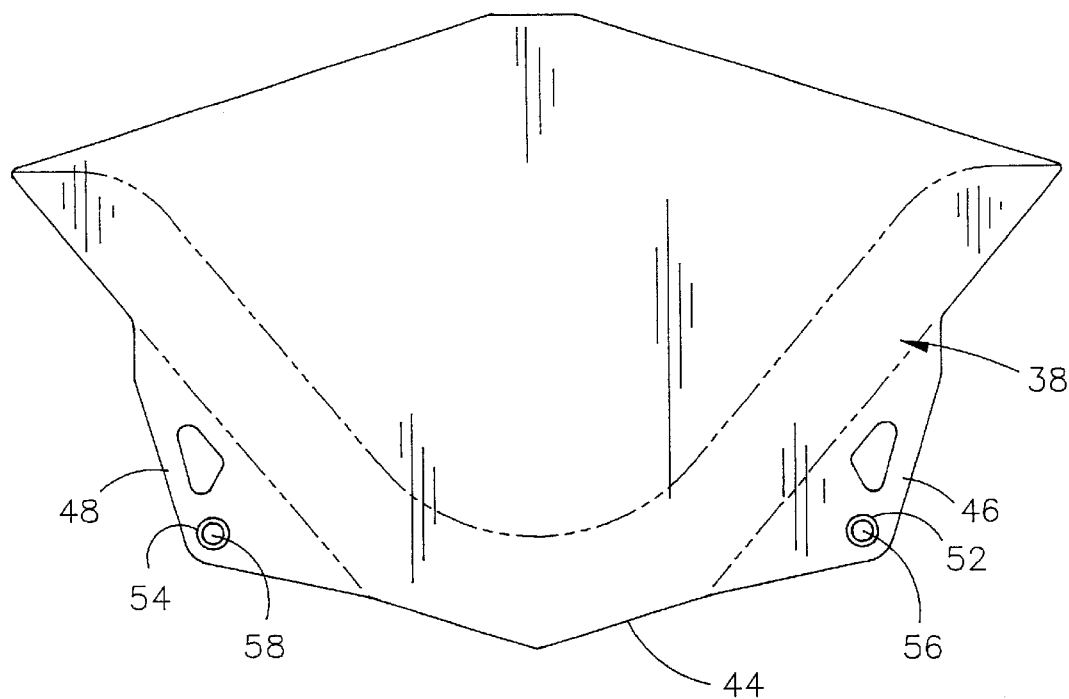
FIG. 5 is an end view of either the rear or front bulkhead.

The side dump body of this invention is referred to generally by the reference numeral 10 including a side dump unit 12 pivotally mounted on a frame means 14 which may be incorporated into a trailer or into what is commonly called a straight truck.

Frame means 14 normally comprises a pair of longitudinally extending frame members 18 and 20 which are conventionally supported on a running gear 22. For purposes of description, the frame means 14 will be described as including a forward end 24, a rearward end 26, and opposite sides 28 and 30. A plurality of horizontally spaced first supports 32 are secured to the wheeled frame at one side thereof while a plurality of spaced-apart second supports 34 are secured to the wheeled frame at the other side thereof.

Side dump unit 12 includes a body or tub 36. Body 36 includes a rear bulkhead 38, intermediate bulkhead 40 and front bulkhead 42. Each of the bulkheads 38, 40 and 42 will be described as having front and rear surfaces for purposes of description. Inasmuch as rear bulkhead and front bulkhead 42 are identical, only rear bulkhead 38 will be described in detail. Further, inasmuch as intermediate bulkhead 40 is substantially identical to bulkheads 38 and 42, only different features thereof will be described.

Rear bulkhead 38 preferably includes a V-shaped lower end 44, although other shapes may be utilized. Opposite lower side edges 46 and 48 have pivot supports 52 and 54 integrally formed therewith which extend laterally outwardly therefrom and which have pivot pins 56 and 58 mounted therein, respectively, which are adapted to be pivotally received by one of the first supports 32 and one of the second supports 34, respectively.

Figure 6:
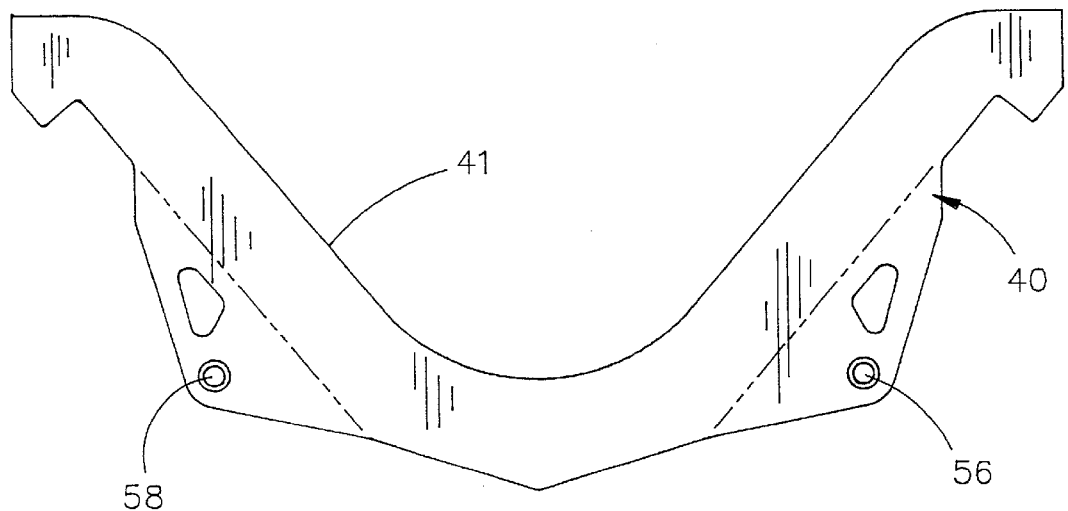
FIG. 6 is an end view of the intermediate bulkhead.
Figure 7:
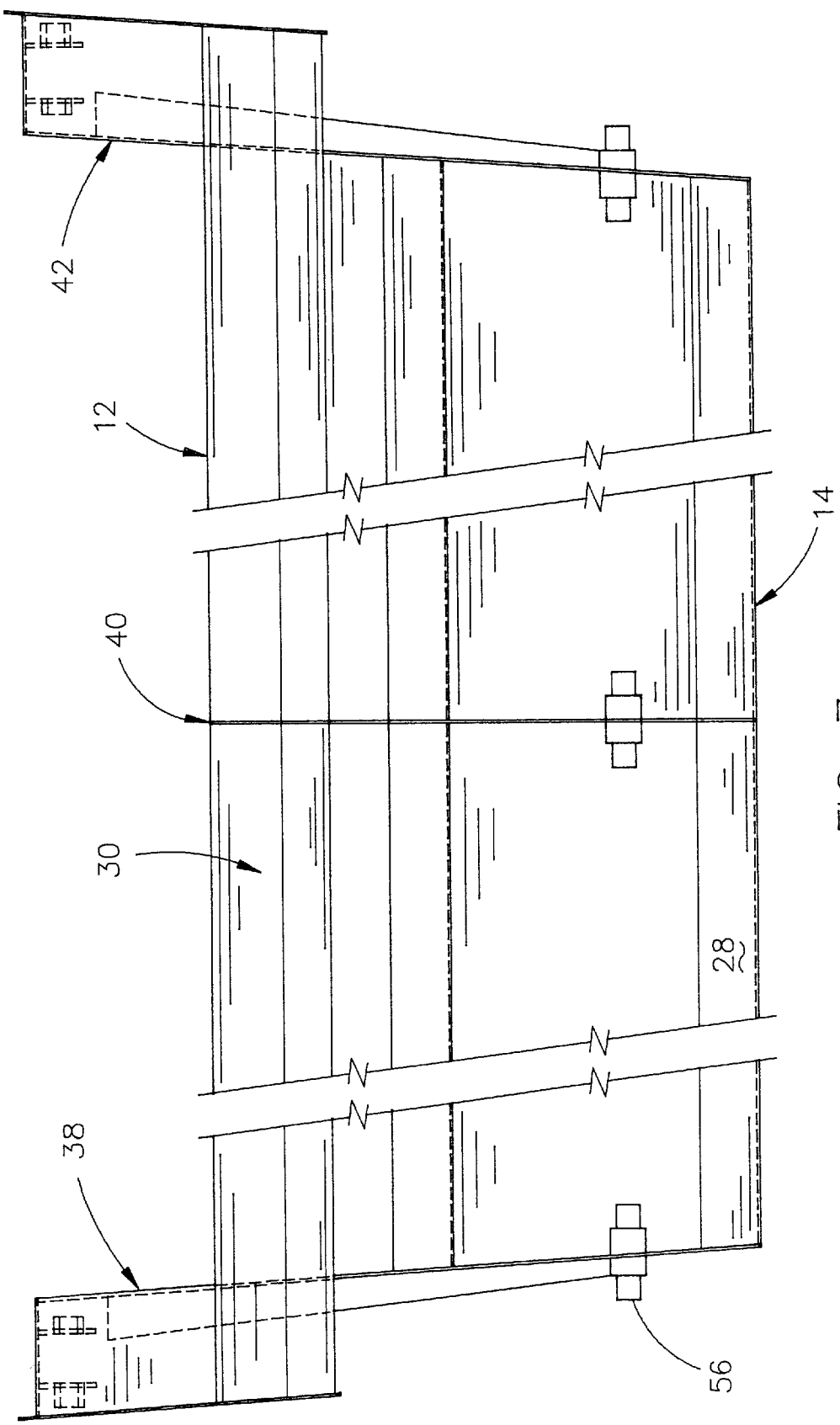
FIG. 7 a partial side elevational view of the side dump body of this invention.

As seen in FIG. 6, intermediate bulkhead 40 is essentially identical in configuration to rear bulkhead 38, with the primary difference being that there is no need for a hydraulic cylinder connection to be provided thereon, since hydraulic cylinders are only pivotally connected to the front and rear bulkheads. The other difference in intermediate bulkhead 40 is that the center portion is cut-away at 41 so that the interior of the body is free from bulkhead interference to enable long objects to be placed in the body.

Body 36 includes rear and front bottom wall portions 60 and 62, rear side wall portions 64 and 66, and front side wall portions 68 and 70. The rear ends of rear bottom wall portion 60 and rear side wall portions 64 and 66 are in abutting engagement with the front surface of rear bulkhead 38 and are welded thereto. The forward ends of rear bottom wall portion 60 and rear side wall portions 64 and 66 abut the rear surface of intermediate bulkhead 40 and are welded thereto. The rearward ends of front bottom wall portion 62 and front side wall portions 68 and 70 abut the front surface of intermediate bulkhead 40 and are welded thereto. The forward ends of front bottom wall portion 62 and front side wall portions 68 and 70 abut the rear surface of front bulkhead 42 and are welded thereto. As seen in the drawings, the rear and front bottom wall portions 60 and 62 are preferably V-shaped in configuration to increase the carrying capacity of the body. In order to further increase the carrying capacity of the body, it is preferred that the rear bulkhead 38 extend upwardly and rearwardly from its lower end to its upper end as illustrated in the drawings and that front bulkhead 42 extend upwardly and forwardly from its lower end to its upper end, as also illustrated in the drawings.

Hydraulic cylinders 72 and 74 are provided at the rearward and forward ends of the body with the upper ends thereof being pivotally connected to the rear and front bulkheads 38 and 42, respectively, to enable the body to be pivotally moved from the non-dumping position to the dumping position.

Thus it can be seen that the instant invention enables a 34-foot trailer, for example, to be easily fabricated by utilizing 17-foot sections for the bottom wall and side wall portions. The same is true for other length trailers. For example, a 20-foot trailer could be fabricated utilizing 10-foot sheet members. Further, the upwardly and outwardly angled construction of the front and rear bulkheads as well as the V-shaped bottom wall provides greater carrying capacity for the body. Additionally, the fact that the pivot supports are integrally formed with the bulkheads greatly reduces the cost of manufacture of the side dump body and greatly reduces the weight which would normally be associated with welding support plates to the side walls of the body.

Thus it can be seen that the invention accomplishes at least all of its stated objectives.

We claim:

1. A side dump apparatus, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

a side dump body movably positioned on said wheeled frame comprising rear, intermediate and front bulkheads with each of the bulkheads having front and rear sides; substantially horizontally disposed front and rear bottom wall portions having front and rear edges; first, second, third and fourth side wall portions having front and rear edges;

said side dump body being movable between transport and dumping positions;

said rear edges of said rear bottom wall portion and said first and second side wall portions abutting said front side of said rear bulkhead and being welded thereto;

said front edges of said rear bottom wall portion and said first and second side wall portions abutting said rear side of said intermediate bulkhead and being welded thereto;

said rear edges of said front bottom wall portion and said third and fourth side wall portions abutting said front side of said intermediate bulkhead and being welded thereto;

said front edges of said front bottom wall portion and said third and fourth side wall portions abutting said rear side of said front bulkhead and being welded thereto;

each of said rear, intermediate and front bulkheads having a first pivot plate portion extending laterally outwardly from one side thereof adjacent the lower end thereof;

each of said first pivot plate portions having a pivot pin associated therewith which is pivotally secured to one of said first supports;

each of said rear bulkhead, intermediate bulkhead and front bulkhead having a second pivot plate portion extending laterally outwardly from the other side thereof adjacent the lower end thereof;

each of said second pivot plate portions having a pivot pin associated therewith which is pivotally secured to one of said second supports on said wheeled frame;

and means operatively interconnecting said wheeled frame and said body for pivotally moving said body between its transport and dumping positions.

2. The side dump apparatus of claim 1 wherein said rear bulkhead extends upwardly and rearwardly from is lower end to its upper end.

3. The side dump apparatus of claim 1 wherein said front bulkhead extends upwardly and forwardly from its lower end to its upper end.

4. The side dump apparatus of claim 2 wherein said front bulkhead extends upwardly and forwardly from its lower end to its upper end.

5. The side dump apparatus of claim 1 wherein said front and rear bottom wall portions are generally V-shaped in cross-section.

6. The side dump apparatus of claim 1 wherein said means for pivotally moving said body comprises a first power cylinder positioned forwardly of said front bulkhead and having one end thereof pivotally secured to said wheeled frame and its other end pivotally secured to said front bulkhead at the upper end thereof and a second power cylinder positioned rearwardly of said rear bulkhead and having one end thereof pivotally secured to said wheeled frame and its other end pivotally secured to the upper end of said rear bulkhead.

7. The side dump apparatus of claim 1 wherein said first and second pivot plate portions are integrally formed with their respective bulkhead.

8. The side dump apparatus of claim 1 wherein said intermediate bulkhead has a central cut-away portion.

9. A side dump apparatus, comprising:

an elongated wheeled frame having a forward end, a rearward end, and opposite sides;

a plurality of horizontally spaced-apart first supports on said wheeled frame at one side thereof;

a plurality of horizontally spaced-apart second supports on said wheeled frame at the other side thereof;

a side dump body movably positioned on said wheeled frame comprising rear, intermediate and front bulkheads with each of the bulkheads having front and rear sides; substantially horizontally disposed front and rear bottom wall portions having front and rear edges; first, second, third and fourth side wall portions having front and rear edges;

said side dump body being movable between transport and dumping positions;

said rear edges of said rear bottom wall portion and said first and second side wall portions abutting said front side of said rear bulkhead and being welded thereto;

said front edges of said rear bottom wall portion and said first and second side wall portions abutting said rear side of said intermediate bulkhead and being welded thereto;

said rear edges of said front bottom wall portion and said third and fourth side wall portions abutting said front side of said intermediate bulkhead and being welded thereto;

said front edges of said front bottom wall portion and said third and fourth side wall portions abutting said rear side of said front bulkhead and being welded thereto;

each of said rear and front bulkheads having a first pivot plate portion extending laterally outwardly from one side thereof adjacent the lower end thereof;

each of said first pivot plate portions having a pivot pin associated therewith which is pivotally secured to one of said first supports;

each of said rear bulkhead and front bulkhead having a second pivot plate portion extending laterally outwardly from the other side thereof adjacent the lower end thereof;

each of said second pivot plate portions having a pivot pin associated therewith which is pivotally secured to one of said second supports on said wheeled frame;

and means operatively interconnecting said wheeled frame and said body for pivotally moving said body between its transport and dumping positions.

10. The side dump apparatus of claim 9 wherein said front and rear bottom wall portions are generally V-shaped in cross-section.

11. The side dump apparatus of claim 9 wherein said first and second pivot plate portions are integrally formed with their respective bulkhead.

12. The side dump apparatus of claim 9 wherein said intermediate bulkhead has a central cut-away portion.

* * * * *